Figures 1, 2:
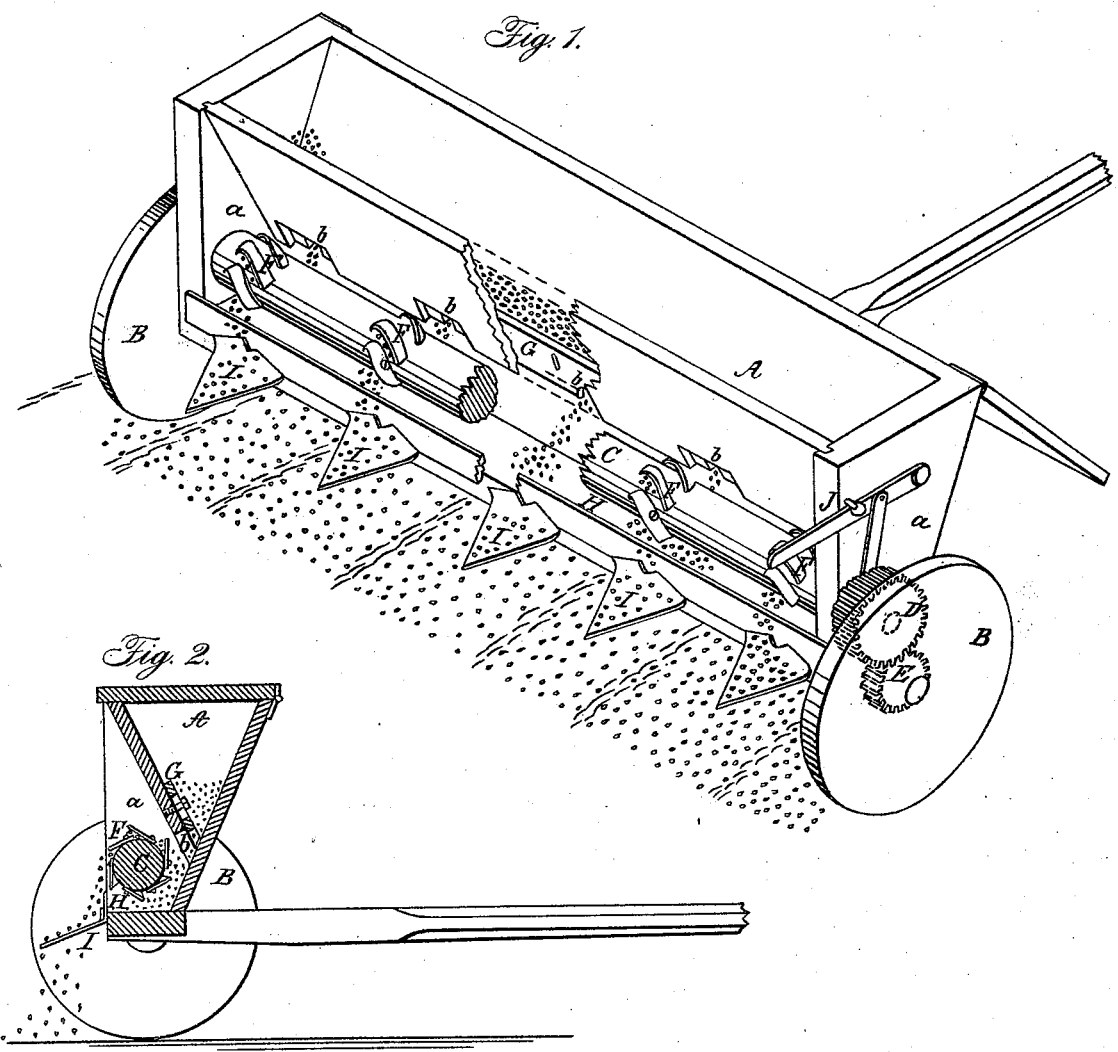

J. BROWN.
Broadcast-Seeder.

No. 12,308.

Patented Jan. 30, 1855.

UNITED STATES PATENT OFFICE.

JOB BROWN, OF LAWN RIDGE, ILLINOIS.

IMPROVEMENT IN SEED-PLANTERS.

Specification forming part of Letters Patent No. 12,308, dated January 30, 1855.

*To all whom it may concern:*

Be it known that I, JOB BROWN, of Lawn Ridge, in the county of Peoria and State of Illinois, have invented a new and Improved Machine for Sowing Seed Broadcast; and I do hereby declare that the following is a full, clear, and exact description of the same, reference being had to the annexed drawings, making a part of this specification, in which—

Figure 1 is a perspective view of my improved machine, a portion of the machine being broken or removed in order to show the slide-board which regulates the discharge from the hopper. Fig. 2 is a transverse vertical section of the same.

Similar letters of reference indicate corresponding parts in the two figures.

This invention relates to a new and improved machine for sowing seed broadcast; and it consists in the employment or use of a series of oblique cups placed upon a rotating cylinder underneath the hopper, in combination with distributing-plates constructed and arranged as will be hereinafter shown, by which combination the seed is conveyed from the hopper and evenly distributed upon the ground, or, as is commonly termed, "sown broadcast."

To enable others skilled in the art to fully understand and construct my invention, I will proceed to describe its construction.

A represents a hopper supported by two wheels, B B, and C represents a cylinder underneath the hopper, the bearings of the cylinder being in the end pieces, a, of the hopper, as shown in Fig. 1.

At one end of the cylinder C there is a toothed wheel, D, which gears into a toothed wheel, E, on the inner side of one of the wheels B, the wheel E being smaller than the wheel D. (See Fig. 1.)

On the cylinder C there are several series of cups, F. Four series are shown in the drawings; but more or less may be used, as desired. The cups of each series are placed at equal distances apart around the cylinder, and in an oblique position, as shown in Fig. 1, each series of cups being opposite an opening, b, in the lower part of the hopper.

Within the hopper A there is a slide, G, by which the openings b may be enlarged or contracted, as desired.

Underneath the cylinder C there is a trough, H, as shown in both figures, and to the outer edge of this trough there are secured plates I, which are of triangular shape and inclined on each side from their center. A plate, I, is secured directly opposite and in line with each series of cups, F, as shown in Fig. 1.

Operation: The seed to be sown is placed in the hopper A, and the slide G is properly adjusted, so as to allow a proper quantity of seed to pass through the openings b. As the machine is drawn along the cylinder C rotates, and with a proper speed, which is obtained by the gear-wheels D E. As the cylinder C rotates the seed passes through the opening b into the cups F, which, by their oblique position, will throw the seed in a continuous stream upon the plates I, which, owing to their inclined surfaces, will scatter and distribute the seed evenly or broadcast upon the ground or earth. The trough H retains all seed that may escape the cups F, and the cups will take the seed from said trough in case it becomes sufficiently high in the trough to come in contact with them. The cylinder C may, when necessary, be thrown out of gear by a lever, J. (See Fig. 1.)

The above machine is simple and efficient, not liable to get out of repair, and is economical to manufacture.

I do not claim separately the distributing-plates I, for they have been previously used; but What I do claim as new, and desire to secure by Letters Patent, is—

The combination of the cups F, placed obliquely on a rotating cylinder, C, in combination with the distributing-plates I, the above parts operating in the manner and for the purpose as herein shown and described.

JOB BROWN.

Witnesses:
CHARLES STONE,
CHARLES BARKER.